(12) United States Patent
Osterloff et al.

(10) Patent No.: US 10,035,503 B2
(45) Date of Patent: Jul. 31, 2018

(54) SYSTEM CONTROL UNIT AND METHOD FOR CONTROLLING A CHARGING SYSTEM THAT IS PROVIDED FOR CHARGING AN ELECTRICAL ENERGY STORAGE DEVICE, AS WELL AS CHARGING SYSTEM AND VEHICLE

(71) Applicant: MTU Friedrichshafen GmbH, Friedrichshafen (DE)

(72) Inventors: Eckhard Osterloff, Langenargen (DE); Martin Roscher, Friedrichshafen (DE); Arndt Von Drathen, Friedrichshafen (DE); Gerhard Droullier, Markdorf (DE)

(73) Assignee: MTU Friedrichshafen GmbH, Friedrichshafen (DE)

( * ) Notice: Subject to any disclaimer, the term of this patent is extended or adjusted under 35 U.S.C. 154(b) by 183 days.

(21) Appl. No.: 15/047,015

(22) Filed: Feb. 18, 2016

(65) Prior Publication Data

US 2016/0159338 A1 Jun. 9, 2016

Related U.S. Application Data

(63) Continuation of application No. PCT/EP2014/002311, filed on Aug. 22, 2014.

(30) Foreign Application Priority Data

Aug. 27, 2013 (DE) .................. 10 2013 014 085

(51) Int. Cl.
*B60W 20/13* (2016.01)
*B60K 6/46* (2007.10)
(Continued)

(52) U.S. Cl.
CPC ............... *B60W 20/13* (2016.01); *B60K 6/46* (2013.01); *B60L 11/12* (2013.01);
(Continued)

(58) Field of Classification Search
None
See application file for complete search history.

(56) References Cited

U.S. PATENT DOCUMENTS 5,030,898 A * 7/1991 Hokanson ............... B60L 11/06
318/144
5,461,289 A 10/1995 Adler et al.
(Continued)

FOREIGN PATENT DOCUMENTS

CN 201268288 Y 7/2009
CN 201427519 Y 3/2010
(Continued)

OTHER PUBLICATIONS

Chinese Office Action, including an English translation thereof, dated Sep. 4, 2017 for Chinese Patent Application No. 201480047575.7 (18 pages).
(Continued)

*Primary Examiner* — Shelley Chen
(74) *Attorney, Agent, or Firm* — Taylor IP, P.C.

(57) ABSTRACT

A system control unit for controlling a charging system that is intended for charging an electrical energy storage device, comprising an electric generator; an internal combustion engine that is mechanically connected with the electric generator; a generator controller for controlling the electric generator; an engine controller for controlling the internal combustion engine; and a transmitting device for transmission of messages, whereby the engine controller is connected with the generator controller by way of the transmitting device, and whereby the engine controller is operable in (Continued)

that a message containing information about an operating state of the internal combustion engine can be produced and said message can be sent to the generator controller via the transmitting device.

14 Claims, 2 Drawing Sheets

(51) Int. Cl.
| | |
|---|---|
| *B60W 10/06* | (2006.01) |
| *B60W 10/08* | (2006.01) |
| *B60L 11/12* | (2006.01) |
| *B60L 11/18* | (2006.01) |
| *B60W 10/26* | (2006.01) |
| *B63H 21/20* | (2006.01) |
| *B60W 50/00* | (2006.01) |

(52) U.S. Cl.
CPC .......... *B60L 11/1851* (2013.01); *B60W 10/06* (2013.01); *B60W 10/08* (2013.01); *B60W 10/26* (2013.01); *B63H 21/20* (2013.01); B60L 2200/32 (2013.01); B60L 2240/36 (2013.01); B60L 2240/42 (2013.01); B60L 2240/423 (2013.01); B60L 2240/44 (2013.01); B60L 2240/443 (2013.01); B60L 2240/662 (2013.01); B60L 2260/12 (2013.01); B60L 2260/167 (2013.01); B60W 2050/0045 (2013.01); B60W 2300/32 (2013.01); B60W 2710/0677 (2013.01); B60W 2710/086 (2013.01); B60W 2710/248 (2013.01); B63H 2021/205 (2013.01); Y02T 10/6217 (2013.01); Y02T 10/6286 (2013.01); Y02T 10/642 (2013.01); Y02T 10/7005 (2013.01); Y02T 10/705 (2013.01); Y02T 10/7077 (2013.01); Y02T 10/7291 (2013.01); Y02T 90/16 (2013.01); Y10S 903/93 (2013.01)

(56) References Cited

U.S. PATENT DOCUMENTS

| | | | | |
|---|---|---|---|---|
| 5,635,817 A | * | 6/1997 | Shiska | .................. H02G 11/02 320/105 |
| 5,797,110 A | * | 8/1998 | Braun | .................. B60W 30/18 477/78 |
| 6,038,500 A | | 3/2000 | Weiss | |
| 6,052,638 A | * | 4/2000 | Genise | .................. B60W 10/06 477/78 |
| 6,190,282 B1 | * | 2/2001 | Deguchi | .................. B60K 6/442 180/65.23 |
| 6,338,391 B1 | * | 1/2002 | Severinsky | ............ B60K 6/442 180/65.23 |
| 7,812,468 B2 | | 10/2010 | Kuroda et al. | |
| 2002/0124830 A1 | * | 9/2002 | Ephraim | ............... F02D 31/009 123/350 |
| 2003/0076071 A1 | | 4/2003 | Kanno | |
| 2003/0111045 A1 | * | 6/2003 | Bruch | .................. F02D 35/027 123/399 |
| 2004/0107040 A1 | | 6/2004 | Edwards, II et al. | |
| 2004/0153237 A1 | | 8/2004 | Braun et al. | |
| 2005/0173169 A1 | | 8/2005 | Gray, Jr. | |
| 2005/0229838 A1 | * | 10/2005 | Lyons | ....................... F02C 9/28 117/11 |
| 2005/0263515 A1 | * | 12/2005 | Fosbinder | ............ B23K 9/0953 219/133 |
| 2007/0243970 A1 | * | 10/2007 | Amano | .................. B60K 6/365 477/3 |
| 2011/0160947 A1 | * | 6/2011 | Ideshio | .................. B60K 6/365 701/22 |
| 2013/0236331 A1 | * | 9/2013 | Hutchinson | ........... F04B 49/065 417/22 |
| 2015/0046009 A1 | * | 2/2015 | Maruyama | ............. B60K 6/445 701/22 |

FOREIGN PATENT DOCUMENTS

| | | |
|---|---|---|
| CN | 101875294 A | 11/2010 |
| DE | 197 39 565 A1 | 3/1999 |
| DE | 10 2008 049 225 A1 | 4/2010 |
| EP | 0 556 942 A1 | 8/1993 |
| EP | 2 033 837 A2 | 3/2009 |

OTHER PUBLICATIONS

Liebl et al. "Intelligente Generatorregelung—Ein Weg zur effizienten Dynamik"; 2006 (10 pages).
International Search Report dated Nov. 12, 2014 for International Application No. PCT/EP2014/002311 (4 pages).

* cited by examiner

SYSTEM CONTROL UNIT AND METHOD FOR CONTROLLING A CHARGING SYSTEM THAT IS PROVIDED FOR CHARGING AN ELECTRICAL ENERGY STORAGE DEVICE, AS WELL AS CHARGING SYSTEM AND VEHICLE

CROSS REFERENCE TO RELATED APPLICATIONS

This is a continuation of PCT application No. PCT/EP2014/002311, entitled "SYSTEM CONTROL UNIT AND METHOD FOR CONTROLLING A CHARGING SYSTEM THAT IS PROVIDED FOR CHARGING AN ELECTRICAL ENERGY STORAGE DEVICE, AS WELL AS CHARGING SYSTEM AND VEHICLE", filed Aug. 22, 2014, which is incorporated herein by reference.

BACKGROUND OF THE INVENTION

1. Field of the Invention

The current invention relates to a system control unit and a method for controlling a charging system that is provided for charging an electrical energy storage device. The charging system includes an electric generator and an internal combustion engine that is mechanically connected to the generator. The current invention moreover relates to a charging system for charging an electrical energy storage device.

2. Description of the Related Art

A vehicle, in particular a watercraft, for example a submarine is generally known that includes an electrical energy storage device, for example a battery. Energy stored in the electrical energy storage device serves to supply various electricity consuming components of the vehicle with electricity. Among other things the energy storage device is used to supply an electric motor with electric current in order to drive the vehicle by way of the electric motor. Since the electrical energy storage device during its use continuously delivers energy and is thus being depleted, a charging system for charging of said electrical energy storage device is required. Electric energy is being generated by this charging system and is then stored in the energy storage device. The energy storage device is then charged.

A known charging system includes an internal combustion engine in which fossil fuel, for example diesel, is burned in order to produce a torque on an output shaft of the internal combustion engine. An electric generator is mechanically connected with the output shaft of the internal combustion engine. The generator serves to convert the mechanical energy that is generated by the internal combustion engine and that is transferred to the generator, into electrical energy. The electrical energy that is produced by the generator is then fed for storage into the electrical energy storage device.

A rated output for the internal combustion engine is normally defined such that the internal combustion engine is in a position to continuously deliver the rated output as the highest performance and to thereby guarantee a long service life for the internal combustion engine. The rated output is determined once for certain worst-case conditions that may exist in the worst case during operation of the internal combustion engine. Thus—under all circumstances that may be anticipated—a reliable operation of the charging system can be achieved for a specific application in which the internal combustion engine is used. Such a worst-case condition is, for example, the least favorable temperature of a coolant that is used for cooling of the internal combustion engine. A generator controller that serves to control the generator receives charging default setting information from a charge control unit of the energy storage device, with a charging default for an output value that is to be delivered by the generator. Such an output value is in particular an output voltage, an output current or an output of the generator. The generator controller requires such output from the internal combustion engine that the generator can meet the charging default demanded by the charge controller. However, the internal combustion engine is adjusted such that it does not provide higher performance than the rated output, even if a higher performance is demanded by the generator controller. In such a case, the generator does not receive the required output of the internal combustion engine and cannot meet the charging default required by the charge controller. In regards to its efficiency the charging system is thus not very flexible.

What is needed in the art is a flexible operation of a charging system that is provided for charging an electrical energy storage device and which includes an electric generator and an internal combustion engine.

SUMMARY OF THE INVENTION

According to the invention a system control unit for controlling a charging system is suggested that includes a generator controller for controlling the generator and an engine controller to control the internal combustion engine. The system control unit moreover includes a transmitting device for transmitting messages. The engine controller is connected with the generator controller via the transmitting device. The engine controller is moreover designed in such a way that a message containing information about an operating state of the internal combustion engine can be produced. The message can be sent to the generator controller via the transmitting device.

A charging system according to the invention for charging an electrical energy storage device includes an electric generator and an internal combustion engine that is mechanically connected to the generator. It moreover includes an inventive system control unit.

A vehicle according to the invention includes an electrical energy storage device and an inventive charging system.

With the method according to the invention, control of a charging system occurs in that a generator is controlled via a generator controller. An internal combustion engine is controlled by way of an engine controller. The engine controller generates a message that includes information relating to the operational condition of the internal combustion engine. This message is sent to the generator controller via a transmission device for transmission of messages which connects the engine controller with the generator controller.

Based on the current invention, it is advantageously possible that the engine controller communicates with the generator controller. Transmission of the information relating to the operational state of the internal combustion engine to the generator controller allows the same to advantageously consider said information in the control of the generator. In particular, the operation of the generator can be adapted especially advantageously to the demands of the energy storage device.

Depending upon the operational state of the internal combustion engine, a time period that is required by the charging system for charging the electrical energy storage device, an output, an output voltage and/or an output current of the charging system can be adjusted. High flexibility in the use of the vehicle can thereby be advantageously achieved. The information relating to the operational state of the internal combustion engine is in particular information relating to a technical operational state, especially advantageously relating to a current performance status of the internal combustion engine.

The term "transmission device" in this case advantageously includes any embodiment of a device with which communications, in particular, information can be transmitted between the engine controller and the generator controller. The transmission device is for example a bus, a network or a cable for the transmission of signals. The messages can be transmitted via the transmission device, for example in the form of electrical signals. The system control unit and its components, in particular the engine controller are advantageously designed in such a way that they conduct their functionalities during operation of the charging system.

The charging system is preferably designed in such a way that an output shaft of the internal combustion engine is mechanically connected with the generator. The generator is herein advantageously an electrical synchronous machine whose rotor is connected with the output shaft. The internal combustion engine is especially advantageously a diesel engine. The vehicle is in particular a watercraft. The vehicle is especially advantageously a submarine.

In one advantageous embodiment of the invention, the engine controller is designed such that a deliverable maximum output of the internal combustion engine can be variably determinable depending on at least one preset parameter. The information relating to the operating status of the internal combustion engine is thereby dependent on this maximum output of the internal combustion engine. Due to the fact that the maximum output of the internal combustion engine is variable, the flexibility in the use and the operation of the charging system can be advantageously further increased. The preset parameters preferably include environmental parameters or environmental conditions for the operation of the charging system or one of its components.

In an especially preferred embodiment of the invention, a rated output is defined for the internal combustion engine. The engine controller is moreover arranged in such a way that the maximum output of the internal combustion engine is definable depending on at least one predefined parameter in such a way that it differs from the rated output and that it is in particular greater than the rated output. The rated output is in particular such a performance that can be provided continuously by the internal combustion engine as the highest performance, whereby a long service life of the internal combustion engine is assured. The rated output is advantageously defined for a specific application of the internal combustion engine. For this specific application—in particular with its specific environmental conditions—the rated output is defined in particular so that the internal combustion engine can provide the rated output continuously, also under very unfavorable conditions. Due to this arrangement of the invention, the maximum output can be defined advantageously dependent upon certain environmental conditions or parameters, deviating from the rated output. With favorable environmental conditions, this allows definition of a maximum output that is greater than the rated output. As a result the maximum output value, for example the maximum output voltage of the generator can also be increased, which in particular enables faster charging of the electrical energy storage device.

In poor environmental conditions definition of a maximum output is possible that is smaller than the rated output. As a result the maximum output value of the generator, in particular its maximum output voltage is limited to an accordingly low level. It is thereby however possible to still maintain the operation of the charging system in spite of the poor conditions, although with lower efficiency. Advantageously, this ensures good reliability of the charging system against failure.

In an especially advantageous embodiment, the system control, in particular the engine controller is arranged so that the maximum output can be determined to be greater over a predetermined time period than the rated output. The maximum output is especially advantageously determinable for a predefined time share of the intended operational duration of the internal combustion engine. This time share of the intended operational duration is preferably between 5% and 20% of the operational duration, in particular approximately 10%. This advantageously guarantees that overloading of the internal combustion engine is avoided and convention maintenance intervals are adhered to.

In yet another advantageous embodiment, the system control unit includes an interface for receiving of external control specifications. The at least one predefined parameter includes a request signal for requesting the maximum output of the internal combustion engine. The system control unit is moreover designed so that the request signal can be generated based on a control specification that is received by it. For this purpose the system control unit includes preferably a receiving interface for receiving an input signal that includes such a control specification. The control specification is particularly a specification from an external operator of the system control unit. Due to this arrangement the defined maximum output of the internal combustion engine can be retrieved especially easily. External control specifications can in particular be supplied to the system control unit in the form of input signals. These input signals are then received at the interface and are from there transmitted in particular to the engine control and/or the generator control.

For simplification purposes the interface has an operating device, for example a key in a keyboard that can be operated by an external operator. When pressing the operating device, the system control unit produces the request signal. For the purpose of receiving input signals the interface is moreover connected with a communication device for transmitting of signals, in particular with a network. Via the communication device, control specifications can thus be advantageously supplied to the system control unit. This allows a remote control of the system control unit.

The information in regard to the operational condition of the internal combustion engine is especially advantageously dependent on one of the following values: an air temperature of the air taken in for the operation of the internal combustion engine; a water temperature of cooling water used for cooling of the internal combustion engine; exhaust gas backpressure that occurs when emitting exhaust gas that occurs during operation of the internal combustion engine; a negative intake pressure that occurs when taking in air. The cited values represent in particular environmental conditions or parameters. By way of the cited values the charging system can operate especially efficiently, in particular charge the electrical energy storage device. It is advantageously possible to optimize the efficiency of the internal combustion engine and/or the generator and at the same time to avoid overloading of these components.

This applies particularly in the case when the vehicle is a watercraft, in particular a submarine. The water temperature is then advantageously the water temperature of the sea water in which the watercraft is located.

In the case of a submarine the exhaust backpressure is a significant value, since this is especially high under water.

Exhaust gases must be emitted from the vehicle to the outside, against the exhaust gas backpressure. The higher the efficiency provided by the internal combustion engine, the more exhaust gas must be emitted against the exhaust gas backpressure to the outside. The exhaust gas backpressure can be very high, depending on the application. It is moreover possible that the exhaust gas backpressure varies greatly, due to waves of different heights. This poses accordingly great demands, in particular of the internal combustion engine and the vehicle controller. A high exhaust gas backpressure may also occur in the use of an exhaust gas after-treatment. The exhaust gas backpressure can be particularly relevant at small performance cross sections.

The negative intake pressure is also especially important if the vehicle is a submarine. The submarine is generally equipped with a snorkel through which air is taken in. If the snorkel is submerged below water during the operation of the submarine it closes temporarily, due to which the negative intake pressure rises. Said negative pressure is disadvantageous for the operation, in particular for the efficiency of the internal combustion engine. The engine controller is designed preferably so that it considers the negative intake pressure, in particular when determining the maximum output of the internal combustion engine.

The above-mentioned values are determined especially advantageously by way of sensors. Their signals or measured values are transmitted to the system control unit, in particular to the interface. The maximum output of the internal combustion engine can be determined reliably by way of one or several of the aforementioned values. In this case one or more of these values are consistent preferably with the at least one parameter with which the maximum output of the internal combustion engine can be determined.

The generator controller is especially preferably designed so that an electrical generator output voltage that is to be produced by the generator is adjustable subject to a predefined maximum current of the generator and the information regarding the operating status of the internal combustion engine. As a result of this it is advantageously possible to protect the generator from damages caused by an excessive generator current and at the same time to permit a suitable generator output voltage, in other words charging voltage for charging of the energy storage device by considering the operational status of the internal combustion engine.

In an other advantageous embodiment of the invention the generator controller has an interface for receiving a default charging input signal. This default charging input signal includes a default charging information of an energy storage device charging controller that serves to control charging of the electrical energy storage device. The generator controller is thereby designed such that the electrical generator output voltage that is to be produced by the generator is adjustable subject to this default charging information. Based on this, the generator controller can advantageously adapt the operating mode of the generator very precisely to the demands of the charging controller and the energy storage device.

The information regarding the operating state of the internal combustion engine is preferably information regarding a reserve capacity of the internal combustion engine. Such communication can be used especially advantageously and efficiently by the generator controller to optimally control the generator subject to available capacity of the internal combustion engine. The reserve capacity is advantageously subject to the previously determined available maximum output of the internal combustion engine. The reserve capacity results in particular from a difference between the previously determined available maximum output and the currently demanded performance of the internal combustion engine. It is preferably possible to relate the reserve capacity to fuel injection amounts of a fuel that is being used to drive the internal combustion engine. The performance difference results in this case preferably from a difference of a maximum injection that is to be injected into the combustion chamber of the internal combustion engine in order to provide the defined maximum output of the internal combustion engine and a current injection amount that is actually being injected into the combustion chamber. The generator controller is preferably arranged in such a way that the maximum value of one of the output values of the generator—in other words in particular its output or output voltage—is determinable subject to the reserve capacity of the internal combustion engine.

The engine controller is particularly advantageously designed in such a way that the reserve capacity can be determined as relative reserve capacity relative to the established maximum output of the internal combustion engine. With this arrangement of the invention the generator controller can be designed in such a way that, when required, a higher output can be provided by the generator and thus the internal combustion engine until the relative reserve capacity of the internal combustion engine is smaller than a predefined first limit value, for example 5%. This ensures, for example, that the output that is to be provided by the internal combustion engine can be increased when required to just below the limit of the reserve capacity, without actually reaching the limit of the reserve capacity. Preferably a small safety range is maintained.

In yet another advantageous embodiment, the generator controller is designed in such a way that the generator output, and thus the output provided by the internal combustion engine can be reduced as soon as the relative reserve capacity of the internal combustion engine is less than a predefined second limit value, for example 3%, whereby the second limit value is smaller than the first limit value. This advantageously ensures that the limit of the reserve capacity of the internal combustion engine cannot be exceeded. The safety range to the actual limit of the reserve capacity is increased by reducing the output of the internal combustion engine.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

If not stated otherwise, the same reference identifications are used for identical or operatively identical elements.

Figure 1:
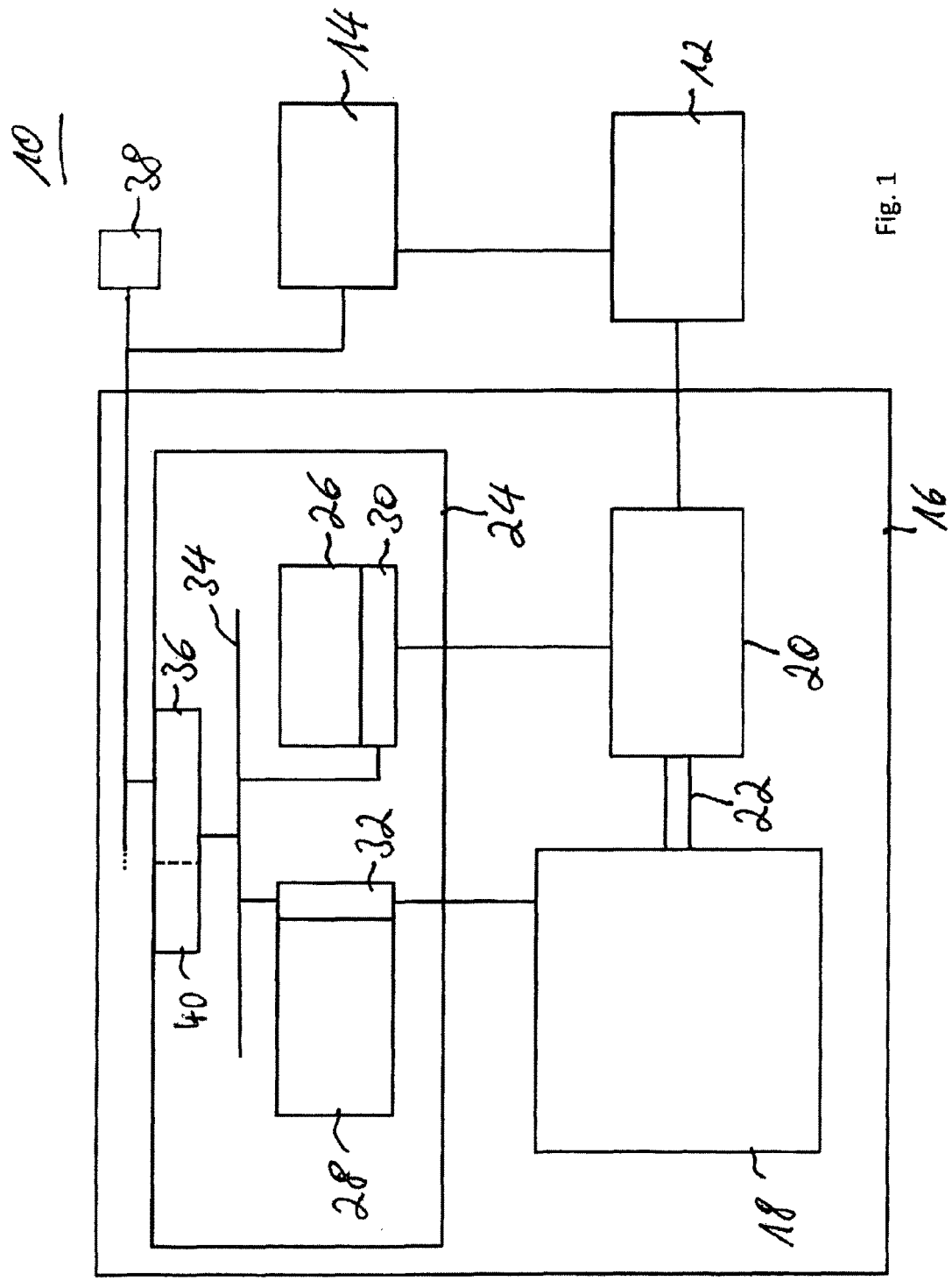
FIG. 1 is a schematic illustration of an inventive vehicle in the embodiment of a submarine that includes a charging system according to the invention, said charging system including a system controller according to the invention.

Referring to FIG. 1, one design example of an inventive vehicle is described. In the current design example the vehicle is a submarine 10. However, the current invention can also be used in other vehicles. Submarine 10 includes a battery 12 as the electrical energy storage device and a charging controller 14 that is connected with battery 12. Battery 12 supplies submarine 10 with electricity. Among other things, battery 12 provides power to an electric engine by way of which submarine 10 is powered. Charging controller 14 serves to control battery 12; it controls in particular charging of battery 12 with electrical energy.

Submarine 10 moreover includes a charging system 16 that is provided to produce electrical energy that can be stored in battery 12. Charging system 16 includes an internal combustion engine 18 and an electrical generator 20 that is electrically connected with battery 12. In the current design example internal combustion engine 18 is a diesel engine that is supplied with diesel fuel. The diesel fuel is stored in a tank. Internal combustion engine 18 includes an output shaft 22 that is mechanically connected with generator 20. Generator 20 in this case is a synchronous machine whose rotor is located on output shaft 22. During operation of charging system 16, output shaft 22 rotates and drives the rotor of generator 20. Due to the rotation of the rotor of generator 20 said generator produces electricity that is supplied via a rectifier to battery 12. Battery 12 is thus being charged.

Charging system 16 moreover includes a system controller 24 to control charging system 16. System controller 24 includes a generator controller 26 to control generator 20 and an engine controller 28 to control internal combustion engine 18. Generator controller 26 includes an interface 30 to receive and transmit signals and engine controller 28 includes an interface 32 to receive and transmit signals. Interface 32 is connected with internal combustion engine 18, in particular with a plurality of components of internal combustion engine 18, for example sensors and actuators, as well as with a bus 34. Bus 34 is a transmitting device for transmission of messages. In the current design example bus 34 connects predominantly engine controller 28 with generator controller 26, so that engine controller 28 can send a message containing information in regard to an operational state of internal combustion engine 18 via bus 34 to generator controller 26. Instead of bus 34, another transmitting device, for example a network or bidirectional connections between the individual components can be provided in charging system 16.

System controller 24 moreover includes an interface 36 via which communications, in particular signals can be exchanged with external components. Interface 36 is preferably connected with a network inside of submarine 10, via which network various components of the submarine can communicate with each other. In particular, remote control of system controller 24 can occur via interface 36.

System controller 24 is advantageously connected via interface 36 with a plurality of sensors, actuators and other controllers of submarine 10. For this plurality of sensors, actuators and other controllers FIG. 1 illustrates representatively a sensor 38 which in the design example is arranged inside submarine 10. In this example, sensor 38 is a temperature sensor for recording the temperature of the sea water in which submarine 10 operates. Sensor 38 is located directly at a water inlet where seawater can be admitted into the submarine in a controlled manner, for example for cooling. It is however equally possible to locate sensors at another location in submarine 10, in particular on the outside of the submarine.

From such controllers and/or sensors measured values and/or calculated values can in particular be transmitted to system controller 24 and are distributed inside system controller 24 for further processing to engine controller 28 and/or generator controller 26. Such measured values and/or calculated values, etc. represent established parameters that are used in particular by engine controller 28 to determine the operating state of internal combustion engine 18. Such measured values and/or calculated values, etc. are used especially advantageously by engine controller 28 to determine a maximum output of internal combustion engine 18. This maximum output is to be provided at a maximum by internal combustion engine 18, subject to the established parameters, that is in particular the measured values and/or calculated values, etc. This means that the maximum output of internal combustion engine 18, subject to at least one of the established parameters can preferably be determined variably. The maximum output or another state variable derived from same assist engine controller 28 preferably to determine or define the operating state of internal combustion engine 18. The operating state is thus advantageously also dependent on at least one of the default parameters. The engine controller 28 is designed in such a way that it can define the maximum output of internal combustion engine 18, subject to measured values and/or calculated values, etc.

Such measured values and/or calculated values, etc. result especially advantageously from environmental conditions of the environment surrounding submarine 10, in particular from conditions or circumstances of elements or media which surround submarine 10 and which are used for the operation of submarine 10 or one of its components. Examples of such elements or media are the air above the water in which submarine 10 operates, and the seawater that surrounds submarine 10.

An example of such a measured value and/or such calculated value is the temperature of air that is used in the combustion of the fuel in internal combustion engine 18. This air temperature is measured by way of a sensor. The air is sucked into the interior of submarine 10 via a snorkel that protrudes above the water. A negative pressure can thereby occur which is relevant for the operating mode of internal combustion engine 18. The lower the pressure, the worse this is for internal combustion engine 18. The negative suction pressure occurs in particular when the top opening of the snorkel submerges in water—for example when strong waves are present—and the snorkel opening closes. The negative suction pressure is measured or otherwise determined and communicated to the engine controller 28 for the purpose of establishing the maximum output of internal combustion engine 18.

An additional measured value for the determination of the negative suction pressure is the water temperature of cooling water that is used for cooling of internal combustion engine 18. In the current example the cooling water is the seawater surrounding submarine 10. The temperature of the seawater is measured and the resulting signal is transmitted to the engine controller 28.

An additional measured value that is determined by a sensor and is used by engine controller 28 to establish the maximum output of internal combustion engine 18 is the exhaust gas back pressure. The exhaust gas back pressure is substantially consistent with the pressure that acts against the exhaust gas when being emitted from the submarine. For the current application in the submarine, the magnitude of the exhaust gas back pressure is especially relevant since the exhaust gas back pressure is especially high and can fluctuate. Internal combustion engine 18 is designed in this case in a suitable manner for such high exhaust gas back pressures.

Because the maximum output of internal combustion engine 18 can advantageously be varied subject to the established parameters, it is not limited to a one-time rated output of internal combustion engine 18. Rather, the defined maximum output can then be established greater than the rated output, in particular if the measured values and/or calculated values, etc. as the default parameters have favorable values. This is the case for example if the water temperature of the cooling water is low. The cooling water is then in a position to more effectively dissipate heat that develops with a higher performance output of internal combustion engine 18. This is for example also the case when the exhaust gas backpressure is low. More exhaust gas is created at a higher performance output of internal combustion engine 18 which must be removed to the outside of submarine 10. If the exhaust gas backpressure is suitably low it is easier to discharge the greater volume of exhaust gas. In a reverse situation of unfavorable measured values and/or calculated values, etc. as the default parameters, the maximum output can advantageously be established lower than the rated output. Charging system 16 is thus in a position—even in unfavorable environmental conditions—albeit with a low efficiency, to provide charging energy for charging of battery 12.

Engine controller 28 is advantageously designed in such a manner that it determines a reserve capacity of internal combustion engine 18. This reserve capacity results from the difference of the established maximum output and the output currently demanded by internal combustion engine 18. The reserve capacity can be determined by the engine controller preferably as a relative reserve capacity related to the established maximum output.

In the current design example interface 36 includes moreover a local input unit in the embodiment of a keyboard 40 through which control defaults for the control of charging system 16 can be input by an external operator of system controller 24. Preferably, such a control specification is a predefined parameter with which the established maximum output of internal combustion engine 18 can be requested. System controller 24 is advantageously designed in such a way that if produces a request signal to demand the established maximum output of internal combustion engine 18, as long as it detects the input of an appropriate control specification, for example through keyboard 40 or by way of remote control via interface 36. The operation of charging system 16 with the requested maximum output of internal combustion engine 18 is described in the current example as boost mode. The term "boost mode" applies for the case where internal combustion engine 18 is driven at an established maximum output that is higher than the rated output, also in the case where the established maximum output is lower than the rated output.

Charging controller 14 is connected via interface 36 with system controller 24. Via bus 34 it is possible for charging controller 14 to communicate with generator controller 26. Above all, via this connection charging controller 14 can transmit a specification to generator controller 26 for a generator output voltage and/or output for charging of battery 12. Alternatively, or in addition, charging controller 14 can be connected directly with interface 30 of generator controller 26 for transmission of messages.

Generator controller 26 is herein designed advantageously so that it determines a generator output value, in particular the generator output voltage or the generator output that is to be produced by generator 20, depending on the operating state of internal combustion engine 18 that is established and/or determined by engine controller 28. For this purpose a message containing information in regard to the operating state is produced by engine controller 28. This message is transmitted via bus 34 to generator controller 26. In the current design example, generator controller 26 determines the generator output value in addition to dependency on a predefined maximum generator output current. This maximum generator output current is determined in particular by the design of generator 20.

Figure 2:
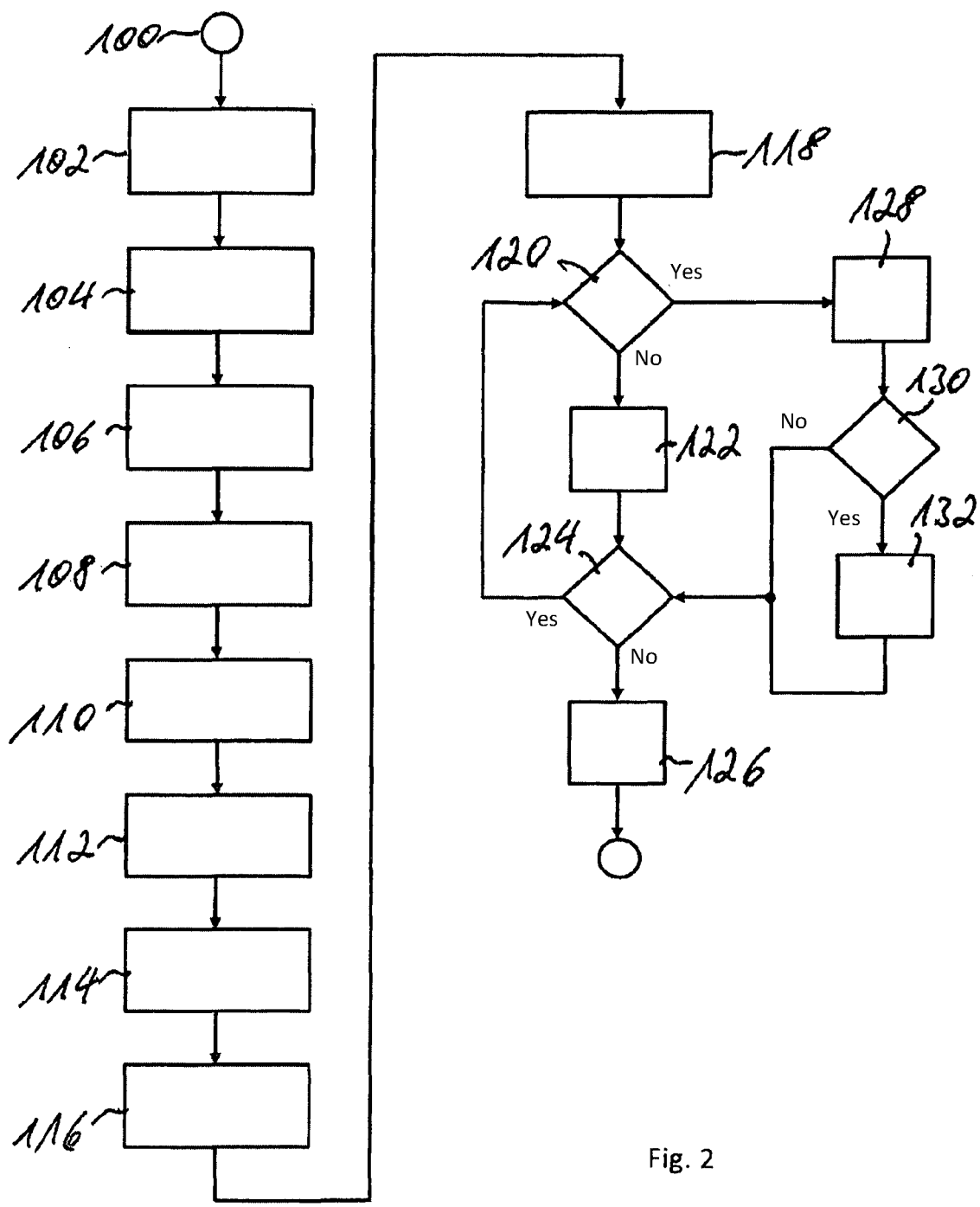
FIG. 2 is a schematic illustration of a flow chart of an embodiment of the inventive method.

Now referring to FIG. 2, is a schematic illustration of a flow chart of a design example of the inventive method for controlling of charging system 16 is described. Modes of operation and functionalities of inventive submarine 10 and charging system 16, as well as of inventive system controller 24 are described more closely with reference to the design example of the inventive method. Especially the functionalities of engine controller 28 and generator controller 26 are discussed.

The current design example of the method according to the invention starts with a step 100. In a step 102 charging controller 14 transmits a voltage demand via interface 36 and bus 34 to generator controller 26 for charging of battery 12. In a step 104 generator controller 26 receives the voltage demand from charging controller 14 at its interface 30 and controls generator 20 in such a manner that it produces the demanded output voltage and delivers it at its output. Generator controller 26 thereby monitors generator 20 so that the maximum generator current is not exceeded. To produce the demanded generator output, generator 20 requires a suitable output of internal combustion engine 18 through which the rotor of generator 20 is driven.

In step 106 generator controller 26 therefore transmits a message to engine controller 28, with information relating to an output that is requested from internal combustion engine 18. In a step 108 engine controller 28 controls internal combustion engine 18 in such a way that it provides the requested output. Engine controller 28 thereby controls internal combustion engine in such a way that—at a maximum—it delivers the established rated output. If the output requested by generator controller 26 exceeds the rated output of internal combustion engine 18, internal combustion engine 18 nevertheless delivers the rated output at a maximum. Should the rated output produced by internal combustion engine 18 not be sufficient for generator 20 to produce the requested output, the request transmitted by charging controller 14 remains partially unfulfilled. Battery 12 is therefore being charged at a slower pace than requested by charging controller 14.

In a step 110 the control default specification that charging system 16 is to transition into the boost mode is input by the operator of system controller 24 on keyboard 40 or via interface 36. This means that the maximum output of internal combustion engine 18 is now determined subject to default parameters, in particular certain environmental conditions. As a result system controller 24 produces a request signal, requesting the maximum output of internal combustion engine 18. The request signal is subsequently transmitted in step 112 to engine controller 28 and generator controller 26. In step 114, measured values and/or calculated values, etc. are captured as predefined parameters, for example by way of sensors and possibly other detection devices for detection of environmental conditions and are transmitted to engine controller 28. In step 116 engine controller 28 establishes the maximum output of internal combustion engine 18 which is dependent upon the transmitted predefined parameters, in particular the measured values and/or calculated values, etc. Engine controller 28 moreover determines the relative reserve capacity of internal combustion engine 18, whereby the reserve capacity is subject to the established maximum output. The engine controller moreover preferably adjusts a boost characteristics curve for the operation of internal combustion engine 18 in boost mode. In step 118 engine controller 28 produces a message containing information regarding the reserve capacity. The reserve capacity thereby corresponds to an operating state of internal combustion engine 18. Subsequently engine controller 28 sends the message containing the information regarding the previously determined relative reserve capacity via bus 34 to generator controller 26.

In step 120 generator controller 26 verifies whether the reserve capacity that was sent by engine controller 28 is smaller than a first limit value. If this is not the case, then generator controller 26 receives permission in step 122 to increase the output of generator 20 if needed, that is, in particular subject to the request issued by charging controller 14. In step 124 it is subsequently verified whether the boost mode continues to be requested. If this is not the case, the method in accordance with the current example branches to a step 126 where the engine controller determines the maximum output of internal combustion engine 18 as the rated output. The rated operation characteristics curve is used as characteristics curve for operation of internal combustion engine 18. If, in the retrieval in step 124 it is noted that the boost mode continues to be requested, then the method branches back to step 120 where it is again checked whether the transmitted reserve capacity is smaller than the first limit value.

If it is noted in step 120 that the transmitted reserve capacity is smaller than the first limit value, then the output of generator 20 is kept constant in step 128. A further increase in the generator output is not permitted, even if a higher output of generator 20 is required due to the request by charging controller 14. In step 130 it is subsequently queried whether the reserve capacity is smaller than a second limit value. The second limit value is thereby smaller than the first limit value. If the reserve capacity is not smaller than the second limit value, then the method branches back to step 124. If the reserve capacity is smaller than the second limit value, step 132 follows where the output of generator 20 is reduced. The method subsequently continues with step 124.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A system control unit for controlling a charging system that is intended for charging an electrical energy storage device, the charging system includes an electric generator and an internal combustion engine that is mechanically connected with the electric generator, said system control unit comprising:
   a generator controller configured for controlling the electric generator;
   an engine controller configured for controlling the internal combustion engine; and
   a transmitting device for transmission of messages, whereby the engine controller is connected with the generator controller by way of the transmitting device, and whereby the engine controller is operable in that a message containing information about an operating state of the internal combustion engine is produced and said message is sent to the generator controller via the transmitting device, wherein the engine controller is operable in that a deliverable maximum output of the internal combustion engine is variably determinable depending on at least one predefined parameter, and information relating to the operating status of the internal combustion engine is dependent on the maximum output of the internal combustion engine, and wherein a rated output is defined for the internal combustion engine, and the engine controller is operable in that the maximum output of the internal combustion engine is definable depending on at least one predefined parameter in such a way that it is higher than the rated output.

2. The system control unit of claim 1, wherein it is operable in that the maximum output can be determined to be greater over a predetermined time period than the rated output.

3. The system control unit of claim 2, wherein it is operable in that the maximum output is determinable for a predefined time share of the intended operational duration of the internal combustion engine.

4. The system control unit of claim 1, wherein the system control unit additionally comprises an interface for receiving of external control specifications and the at least one predefined parameter includes a request signal for requesting the maximum output of the internal combustion engine, whereby the system control unit is moreover operable in that the request signal can be generated based on a control specification that is received by it, in particular from an external operator of the system control unit.

5. The system control unit of claim 4, wherein the information relating to the operational state of the internal combustion engine is dependent on one of the following values: an air temperature of the air taken in for the operation of the internal combustion engine; a water temperature of cooling water used for cooling of the internal combustion engine; exhaust gas backpressure that occurs when emitting exhaust gas that occurs during operation of the internal combustion engine; and a negative intake pressure that occurs when taking in air.

6. The system control unit of claim 5, wherein the generator controller is operable in that an electrical generator output voltage that is to be produced by the electric generator is adjustable subject to a pre-defined maximum generator current and the information regarding the operating status of the internal combustion engine.

7. The system control unit of claim 6, wherein the generator controller has an interface for receiving a default charging input signal that includes a default charging information of an energy storage device charging controller that serves to control charging of electrical energy storage device, whereby the generator controller is operable in that the electrical generator output voltage that is to be produced by the electric generator is adjustable subject to the default charging information.

8. The system control unit of claim 7, wherein the information relating to the operational state of the internal combustion engine includes information regarding a reserve capacity of the internal combustion engine.

9. The system control unit of claim 8, wherein the engine controller is operable in that the reserve capacity can be determined as relative reserve capacity, with regard to the established maximum output of the internal combustion engine.

10. The system control unit of claim 9, wherein the generator controller is operable in that a higher output can be provided by the electric generator until the relative reserve capacity of the internal combustion engine is smaller than a predefined first limit value.

11. The system control unit of claim 10, wherein the generator controller is operable in that the electric generator output can be reduced as soon as the relative reserve capacity of the internal combustion engine is smaller than a predefined second limit value, whereby the second limit value is smaller than the first limit value.

12. A vehicle, comprising:
a charging system which includes an electric generator and an internal combustion engine that is mechanically connected with the electric generator;
a system control unit for controlling the charging system that is intended for charging an electrical energy storage device, the system control unit including:
a generator controller for controlling the electric generator;
an engine controller for controlling the internal combustion engine; and
a transmitting device for transmission of messages, whereby the engine controller is connected with the generator controller by way of the transmitting device, and whereby the engine controller is operable in that a message containing information about an operating state of the internal combustion engine is produced and said message is sent to the generator controller via the transmitting device, wherein the engine controller is operable in that a deliverable maximum output of the internal combustion engine is variably determinable depending on at least one predefined parameter, and information relating to the operating status of the internal combustion engine is dependent on the maximum output of the internal combustion engine, and wherein a rated output is defined for the internal combustion engine, and the engine controller is operable in that the maximum output of the internal combustion engine is definable depending on at least one predefined parameter in such a way that it is higher than the rated output.

13. The vehicle of claim 12, wherein the vehicle is a watercraft.

14. A method for controlling a charging system that is intended for charging an electrical energy storage device which includes an electric generator and an internal combustion engine that is mechanically connected with the electric generator, said method including the steps of:
controlling the electric generator by way of a generator controller;
controlling the internal combustion engine by way of an engine controller; and
producing a message by the engine controller which includes information in regard to the operational state of the internal combustion engine, and this message is transmitted to the generator controller via a transmitting device for the transmission of messages which connects the engine controller with the generator controller, wherein the engine controller is operable in that a deliverable maximum output of the internal combustion engine is variably determinable depending on at least one predefined parameter, and information relating to the operating status of the internal combustion engine is dependent on the maximum output of the internal combustion engine, and wherein a rated output is defined for the internal combustion engine, and the engine controller is operable in that the maximum output of the internal combustion engine is definable depending on at least one predefined parameter in such a way that it is higher than the rated output.

* * * * *